UNITED STATES PATENT OFFICE.

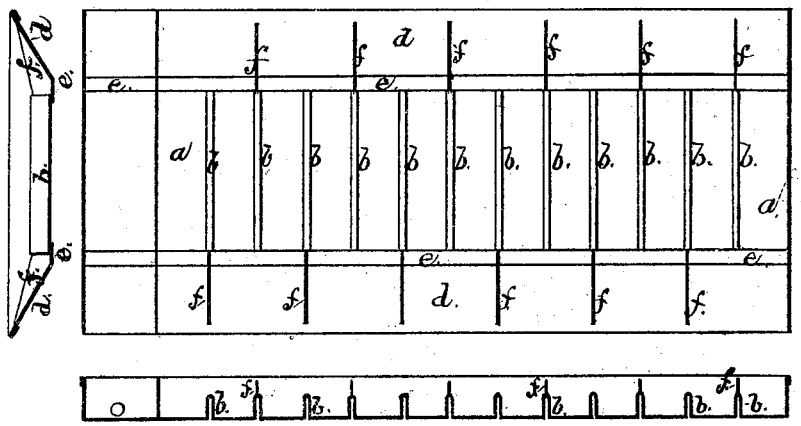
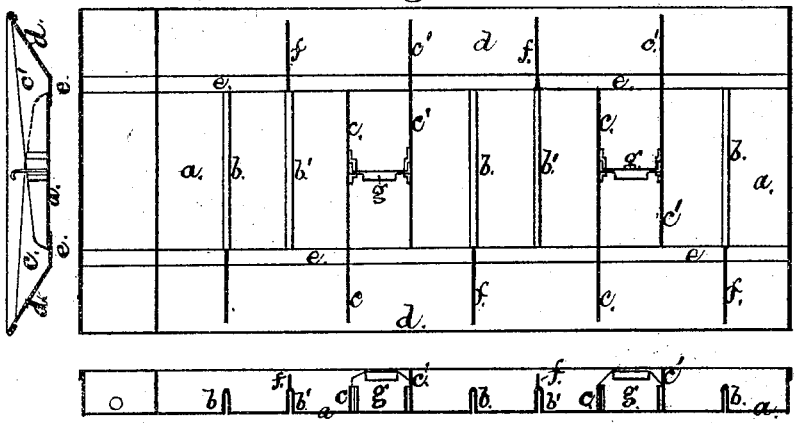
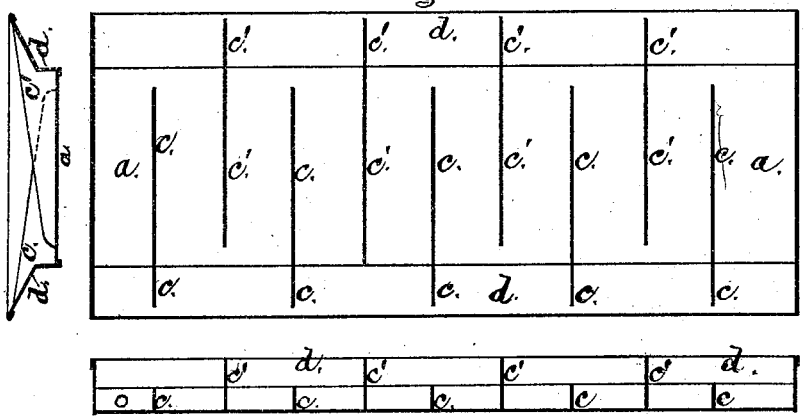

FRANCIS G. BUTLER, OF BELLOWS FALLS, VERMONT.

IMPROVEMENT IN APPARATUS FOR EVAPORATING AND CLARIFYING SACCHARINE LIQUIDS.

Specification forming part of Letters Patent No. 119,694, dated October 10, 1871.

*To all whom it may concern:*

Be it known that I, FRANCIS G. BUTLER, of Bellows Falls, in the county of Windham and State of Vermont, have invented certain new and useful Improvements in Apparatus for Clarifying and Condensing Saccharine Fluids.

The nature of my invention will be understood from the specification and drawing.

Figure 1 represents—in plan view, longitudinal section, and cross-section—an evaporating-pan embodying my improvements. Figs. 2 and 3 represent similar views of modifications.

Like letters designate similar parts in the several figures.

Referring to Fig. 1, $a$ is the bottom of the pan, having crimps, corrugations, or partitions $b$ $b'$ therein, extending across the width of the bottom sheet. These are made in pairs $b$ $b'$, alternating with pairs of long elevated scum-arresters $c$ $c'$, hereinafter more particularly described. The sides $d$ of the pan are made flaring at about forty-five degrees, more or less, with the bottom of the pan, as shown, and are offset from such bottom as seen at $e$, in order to leave a clear unobstructed passage for the currents between the free ends of the partitions and the sides, as well as between the free ends of the long scum-arresters and the sides, notwithstanding such partitions and long scum-arresters may extend the whole breadth of the bottom sheet. This off-setting precludes the necessity of cutting away (as has heretofore been the practice) of the ends of the crimps, and avoids all the consequences of such cutting away, such as lapping down a part and fastening or riveting it to the bottom, and the making holes in the bottom for such rivets, or the soldering down of such lapped parts and the melting of the solder under the heat while evaporating. Each partition or crimp is directly connected at one end (but at alternate ends throughout the series of partitions) to its own special scum-arrester $f$, which serves to continue it out to and connect it with the side of the pan, and thus not only to compel a continuous transverse current of the juice, but also, by reason of the elevation or upward rise of such connected arresters from the top line of the partition to nearly the top line of the side of the pan, to cause an arrest and detention of the scum at the side within the three-sided high-walled chamber, bounded by the high walls of the short scum-arrester, the sides of the pan and the long scum-arresters $c$ or $c'$. I find a very efficient mode of connecting a crimp with the short scum-arrester is to insert the inner end of the latter within the open end of a crimp, and then secure them together in any appropriate manner. The free ends of the crimps may be closed in any well-known manner. The long scum-arresters $c$ $c'$ are also connected with the sides of the pan, as shown, and extend nearly or quite across the whole breadth of the bottom sheet as shown. Their top lines have a gradual downward inclination. Between any or every pair of these long arresters I place a gate, $g$, as seen, locating it about midway of the breadth of the pan. The gate is arranged to be closed, or to be raised or lowered at will, to any desired elevation, in ways or guides affixed to the arresters; and I prefer to have these guides such that the gate shall also serve to hold the arresters from being accidentally or forcibly sprung apart from each other. This gate, connecting the high scum-arresters, not only forms a barrier against the passage of the juice so as to hold it back in separate compartments whenever desired but, being located near the center and at considerable distance from the ends of both of the arresters which it connects, and at a point where there is the least possible accumulation of scum or none at all, there is no liability of the scum thrown off to the sides, passing through the gates when opened. By reason of this construction the juices, as they flow from one section or compartment through the passage beneath the gate to the next section, leave behind all the impurities separated therefrom up to that stage of the process; and those generated in the next compartment are similarly left behind at the sides only of that compartment; and this in the most complete and efficient manner. In the modification shown in Fig. 2 I have shown my long scum-arresters alternating with each other in continuous series. In the modification shown in Fig. 3 I have shown a continuous series of crimps connected to the sides by short scum-arresters, the sides being set off from the bottom, as before described. Any convenient battery or "teache" may be attached to the pan. In some instances the piece which connects the crimp or partition to the side may have its top line horizontal instead of inclining upward, and about in line with the top of the crimp.

What I claim as new, and desire to secure by Letters Patent, is—

1. Elongated elevated scum-arresters extending from opposite sides of the pan and reaching nearly across its bottom.

2. Corrugations, crimps, or partitions connected at alternate ends to the flaring sides by the scum-arresters or an extension piece.

3. The combination, with two adjacent elevated scum-arresters reaching nearly across the bottom of the pan, of a cross-gate connecting the same about midway of the pan.

4. The combination, with corrugations, crimps, or partitions extending across the bottom sheet, of sides set off from such bottom and from the partitions or crimps, substantially as shown and described.

5. An evaporating pan constructed with a series of pairs of contiguous elevated scum-arresters, alternating with a series of pairs of corrugations, crimps, or partitions, the ends of each of such corrugations being alternately connected to the sides, substantially as set forth.

6. The scum-arresters, in combination with an evaporator having partitions or crimps arranged to produce a continuous transverse channel.

FRANCIS G. BUTLER.

Witnesses:
JOHN J. HALSTED,
WILMER BRADFORD. (108)